United States Patent [19]

Ishikawa et al.

[11] Patent Number: 4,769,195
[45] Date of Patent: Sep. 6, 1988

[54] MANUFACTURING A SILICON CARBIDE FIBER REINFORCED GLASS COMPOSITE USING PLASMA SPRAYING

[75] Inventors: Toshikatsu Ishikawa, Tokyo; Haruo Teranishi, Machida; Hiroshi Ichikawa, Yokohama; Yoshikazu Imai; Masanobu Umezawa, both of Tokyo, all of Japan

[73] Assignee: Nippon Carbon Co. Ltd., Tokyo, Japan

[21] Appl. No.: 76,283

[22] Filed: Jul. 22, 1987

Related U.S. Application Data

[62] Division of Ser. No. 917,011, Oct. 9, 1986, Pat. No. 4,717,589.

[30] Foreign Application Priority Data

Oct. 14, 1985 [JP] Japan .................. 60-227020
Oct. 14, 1985 [JP] Japan .................. 60-227021

[51] Int. Cl.$^4$ ............... B29C 00/00; B28B 11/00; B05D 1/00
[52] U.S. Cl. .................. 264/60; 264/67; 264/258; 264/259; 264/265; 427/34; 427/177; 428/367; 428/384

[58] Field of Search ............... 427/34, 177; 428/367, 428/384; 65/3.1, 3.2; 264/60, 67, 258, 265; 219/121 PL; 264/259

[56] References Cited

U.S. PATENT DOCUMENTS

| | | | |
|---|---|---|---|
| 4,048,348 | 9/1977 | Bailey et al. | 427/34 |
| 4,428,763 | 1/1984 | Layden | 428/367 |
| 4,435,455 | 3/1984 | Prewo et al. | 428/367 |
| 4,460,638 | 7/1984 | Haluska | 428/367 |

Primary Examiner—Norman Morgenstern
Assistant Examiner—Margaret Burke
Attorney, Agent, or Firm—Edmund M. Jaskiewicz

[57] ABSTRACT

A method for manufacturing a silicon carbide fiber reinforced glass composite, which comprises either dipping silicon carbide fibers in molten glass in a tank, the molten glass being given wave vibration of 10–30 KHz by a supersonic vibrator provided with a cooling means to unravel the silicon carbide fibers and have the molten glass permeated therebetween, or plasma melt ejecting glass powder onto silicon carbide fibers to obtain a silicon carbide fiber/glass preform, molding the preform into a predetermined form and then subjecting the molded preform to thermal molding thereby to manufacture the silicon carbide fiber reinforced glass composite in the form of a molding.

3 Claims, 2 Drawing Sheets

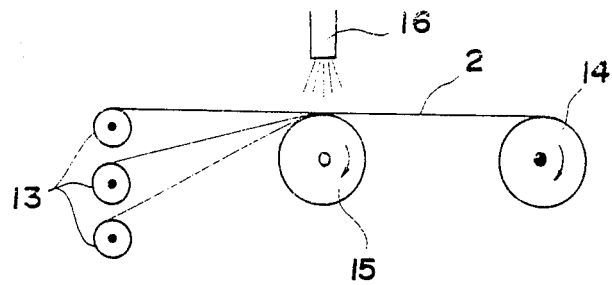
F I G. 3
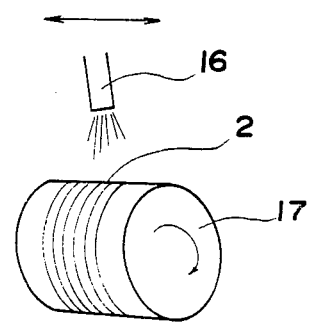
F I G. 4

MANUFACTURING A SILICON CARBIDE FIBER REINFORCED GLASS COMPOSITE USING PLASMA SPRAYING

This is a division of application Ser. No. 917,011, filed Oct. 9, 1986, now U.S. Pat. No. 4,717,589.

BACKGROUND OF THE INVENTION

1. Field of the Invention

The present invention relates to a method for manufacturing a silicon carbide fiber reinforced glass composite which consists of silicon carbide fibers having glass melt or glass matrix permeated therebetween to such extent as not to leave any cavities and which is characterized by light weight and other various excellent properties such as superior flexibility, strength, oxidation stability and heat resistance.

2. Prior Art

Conventionally, as heat-resisting structural materials capable of withstanding heat at 800° C. or more, Ni-, Co-, W-, Fe- and Cr-based heat-resisting alloys and titanium-based alloys have been used. When exposed to such high temperatures, however, the strengths of such metallic materials are known to decrease to less than 50%, very often 10–20%, of those at room temperature, so that they can only narrowly withstand such high temperatures.

The alloys such as Fe, Ni and Co alloys have such relatively large specific gravities ranging from 7 to 9 that they are disadvantageous for use as materials for the manufacture of aircrafts requiring their weight to be as light as possible, and these disadvantages have been a bar to further improvements in the performances of various aircrafts. Furthermore, metallic materials such as titanium occur in a limited quantity among natural resources, thereby raising them in price.

Thus, in the field of heat-resisting structural materials, researchers and developments of high strength fiber reinforced composites such as high strength fiber reinforced ceramic composites, high strength fiber reinforced resin composites and high strength fiber reinforced metal matrix composites and ceramic materials have been intensively made in recent years, and these composites and materials are expected to find a wide use as the materials for aircrafts, rockets, spacecrafts and so forth.

Among the fiber reinforced metal matrix composites, a fiber reinforced aluminum alloy composite capable of withstanding a relatively low temperature of 400° C. is known as the most common composite at present. On the other hand, the ceramic materials such as silicon carbide, silicon nitride, alumina and zirconia are capable of maintaining their original strength even at 800° C. or more, but they are not able to be put to practical use because of their inherent brittleness which has not been solved yet. Under such circumstances, a fiber reinforced glass composite, one of the fiber reinforced ceramic composites, is coming to the fore as the most promising high heat-resisting material because of its advantageous properties such as high strength and high toughness at high temperatures and light weight.

As reinforcing fibers for the fiber reinforced glass composite, there are graphite fibers, alumina fibers and silicon carbide fibers, but one of the most important problems common to them is the maximum working temperature. The upper limit of working temperature is comparatively high in, for example, graphite fiber reinforced glass composites or alumina fiber reinforced glass composites, but such working temperatures are still not high enough to meet the requirements for actual higher heat resistance. For example, the graphite fiber reinforced glass composites have high levels of strength, fatigue resistance and rupture resistance but they are disadvantageously subject to harmful oxidation of fibers at temperatures higher than 400° C. On the other hand, the alumina fiber reinforced glass composites are stable against such oxidation at high temperatures, but they raise problems concerning its strength and rupture resistance since the alumina fibers react with the glass to cause vitrification, thus causing the erosion of reinforcing fibers and the deterioration of the strength and rupture resistance of the composites.

In the case of the silicon carbide fiber reinforced glass composite, however, the silicon carbide fibers themselves are resistant to oxygen in air at a high temperature, able to maintain their excellent strength and do not react with the glass, and thus the glass composite reinforced by the silicon carbide fibers has higher strength, toughness and oxidation resistance. The silicon carbide fibers discussed herein are those with diameters of not more than $50\mu$ manufactured from an organic silicon compound.

Thus, the silicon carbide fiber reinforced glass composite has come to the fore recently because of its high heat resistance, oxidation resistance, strength and rupture resistance. Conventionally, silicon carbide fiber reinforced glass composite is manufactured from a preform sheet manufactured by a powder slurry method. In the powder slurry method, the glass powder is made to adhere to the silicon carbide fibers through a resin such as polyvinyl alcohol, but the resulting composite is known to have the disadvantage that the permeation of the glass powder among the fibers is not sufficient thereby causing insufficient adhesion between the silicon carbide fibers and the glass. Besides, this method requires the resin and other chemicals used to be removed by heat treatment prior to the molding process, but such heat treatment is not so complete that the trace of carbon is left on the surfaces of the fibers thereby causing the deterioration of the properties of the resulting composite.

OBJECT OF THE INVENTION

An object of the present invention is to provide a method for manufacturing silicon carbide fiber reinforced glass composites which are free of the aforementioned problems of conventional fiber reinforced composites and have various improved properties such as excellent heat resistance, oxidation resistance, strength and rupture resistance. Therefore, they may preferably be used as materials especially for structural portions which require high heat resistance, high stability against oxidation at high temperatures, high strength and high rupture resistance in aircrafts, rockets, spacecrafts and the like.

The present inventors have intensively engaged in the researches for attaining the above-mentioned object of the invention. As a result, the inventors have found that the silicon carbide fiber reinforced glass composite meeting the requirements of the objective of the present invention can be obtained by either dipping silicon carbide fibers in molten glass in a tank, the molten glass being given wave vibration by a supersonic vibrator or plasma melt jetting glass powder onto silicon carbide fibers to obtain a silicon carbide fiber/glass preform, molding the preform into a predetermined form and then subjecting the molded preform to thermal molding by the use of hot press or the like thereby to manufacture the silicon carbide fiber reinforced glass composite.

SUMMARY OF THE INVENTION

More particularly, the present invention relates to the method for manufacturing a silicon carbide fiber reinforced glass composite, which comprises either dipping silicon carbide fibers in molten glass in a tank, the molten glass bieng given wave vibration of 10-30 KHz by a supersonic vibrator provided with a cooling means to unravel the silicon carbide fibers and have the molten glass permeated therebetween, or plasma melt jetting glass powder onto silicon carbide fibers to obtain a silicon carbide fiber/glass preform, molding the preform into a predetermined form and then subjecting the molded preform to thermal molding thereby to manufacture the silicon carbide fiber reinforced glass composite in the form of a molding.

BRIEF DESCRIPTION OF THE DRAWINGS

FIG. 3 is a schematic drawing to illustrate a third embodiment of process for manufacturing a preform according to the present invention.

FIG. 4 is a schematic drawing to illustrate a fourth embodiment of such a process as mentioned above.

DETAILED DESCRIPTION OF THE INVENTION

The invention will be explained in details hereunder in reference to the drawings.

Figure 1:
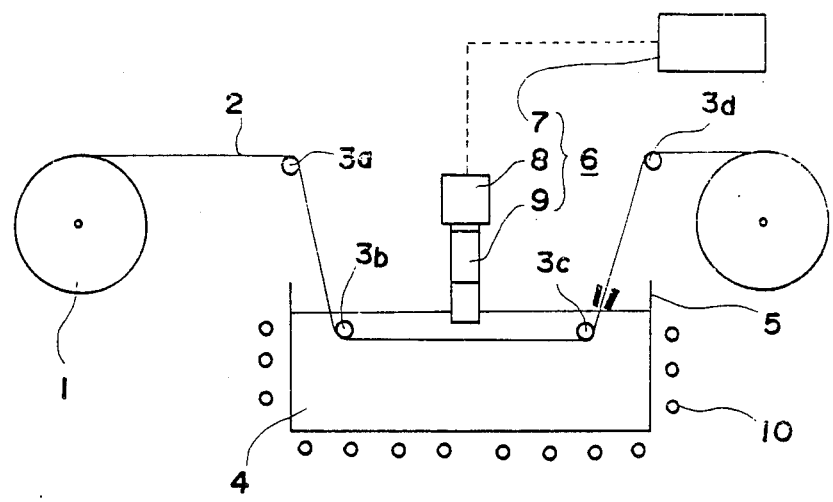
FIG. 1 is a schematic drawing of a first embodiment of process for manufacturing silicon carbide fiber reinforced glass preform according to the present invention.

In FIG. 1, silicon carbide fiber bundle 2 pulled and arranged properly by fiber bundle-pulling-and-arranging device 1 is introduced into a tank 5 filled with molten glass 4 by way of guide rollers 3a and 3b in order to have the molten glass permeated between the fibers. Also, according to the present invention, fabrics of silicon carbide fibers, mats, paper or other various fabrics may be used instead of the silicon carbide fiber bundle 2. The molten glass 4 may be borosilicate glass, silica glass, lithium alminosilicate or the like.

Figure 2:
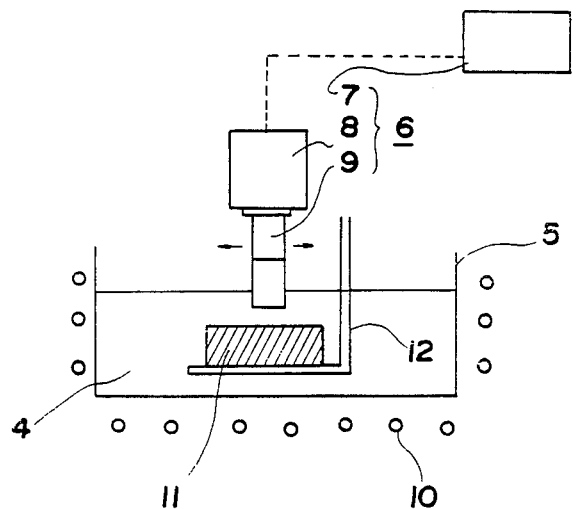
FIG. 2 is a schematic drawing to illustrate a second embodiment of process for manufacturing a preform according to the present invention.

As shown in FIG. 1 and FIG. 2, the molten glass 4 in the tank 5 is subjected to vibration caused by a supersonic vibrator 6. The supersonic vibrator 6 consists of an oscillator 7 and a vibrator 8. The lower part of a horn 9 of the vibrator 8 is kept dipped in the molten glass 4 in the tank 5, and the vibration is delivered to the molten glass 4 through the horn 9 of the vibrator 8 which is actuated by signals from the oscillator 7. Said horn 9 is required to have a gap or hole for cooling water at its upper part of water-cooling jacket in order to prevent the heat of molten glass 4 from being transmitted to the vibrator 8, and such water-cooling device needs to be provided at the point corresponding to the nodal point of half-wave length of the supersonic wave to be used. The gap for cooling water or the water-cooling jacket provided at such point of the horn will prevent crack of the horn even when it is used for the delivery of the supersonic wave for a long period of time. The relationship between the wavelength (L) of the supersonic wave through the horn 9 and the frequency of the supersonic wave can be expressed by the following equation (1):

$$C_t(\text{sonic speed through horn at temperature of molten glass}) = \quad (1)$$
$$L(\text{wavelength of sonic wave through horn}) \times f(\text{frequency})$$

According to one embodiment of the present invention, a silicon carbide fiber bundle is dipped in molten glass given a certain wave vibration to unravel it and have the molten glass permeated between the fibers. In this case, just prior to being dipped, the silicon carbide fibers may be subjected to melt jetting of glass to fix the fibers with glass attached thereto for the prevention of entanglement of the fibers during their travel or passage to the molten glass tank.

The glass deposited on the surface of the silicon carbide bundle 2 is required to melt when said bundle has reached right under the horn 9 in the molten glass tank 5. If said glass is molten before reaching the point right under the horn 9 in the molten glass tank 5, the effect of arrangement of the silicon carbide fibers in parallel to each other in a bundle will become useless. When the glass deposited on the surface of said bundle of fibers has failed to melt even right under said horn 9, the glass will not be able to permeate well among the individual silicon carbide fibers constituting the bundle 2.

When this is taken into consideration, it is desirable for the temperature of the molten glass tank 5 to be set to the temperature at which the viscosity of the molten glass becomes not more than $10^4$ poise. Such control of the temperature of the molten glass tank 5 can be accomplished with the electric heater or heating device 10 provided around said tank 5. It is desirable for the silicon carbide fiber bundle 2 to be dipped in the molten glass tank 5 for not more than 50 seconds. In manufacturing the multi-dimensional fabric of silicon carbide fiber/glass preform, a holder 12 is provided in order to smoothly hold a silicon carbide fiber body 11 as shown in FIG. 2.

The vibration generated by the supersonic vibrator 6 can be controlled by setting the resonant frequency properly, and the frequency of the supersonic wave used for the vibration is normally within the range of 10 to 30 KHz. As for the material of the horn 9 in the supersonic vibrator 6, the most suitable material such as stainless steel, a nickel alloy, molybdenum, tungsten, titanium or ceramic which has a large durability should be selected depending on the working conditions since the horn 9 is required to withstand the supersonic vibration in the molten glass. Further, the horn 9 will usually exhibit the highest vibration efficiency if two horns connected to each other are used and, on the other hand, it will exhibit a somewhat decreased vibration efficiency as compared with the former case if at least three horns connected to one another are used. The horn 9 may take any cross-sectional form. For example, it may take a circular, rectangular or horseshoe shape.

When the silicon carbide fiber bundle which has been pulled and arranged orderly is subjected to supersonic wave treatment (in the molten glass), the silicon carbide fibers of the bundle permit the molten glass to permeate well among themselves thereby minimizing the cavities left in the resulting.

Said silicon carbide fiber bundle 2 is drawn out continuously by way of the guide rollers 3c and 3d not only to be shaped into a desired form but also to squeeze excessive molten glass out of it before it is turned into a preform containing fibers in a specified volume ratio. The preforms are cut or laminated together if desired and then shaped into a desired form with a hot press or a high-temperature uniform-pressure press under heat. As for the conditions for the forming under heat, in the case of the forming by the hot press, the forming temperature is 1000° to 1600° C.; the forming pressure is 5 to 200 kg/cm²; the forming time is not longer than one hour; and the forming should take place in vacuum or an inert gas atmosphere. In the case of the forming with the high-temperature uniform-pressure press, the forming temperature is 1000° to 1600° C.; the forming pressure is 5 to 500 kg/cm²; the forming time is not longer than one hour; and the forming should take place in an inert gas atmosphere.

In FIG. 3, the silicon carbide fiber bundle 2 from a plurality of creels 13 is continuously pulled over a roll 15 to a take-up reel 14 in order to arrange the bundle 2 orderly under tension while glass powder is plasma melt jetted by a plasma melt jetting device 16 to the moving bundle 2 just on the roll 15. The glass powder used in this case may be powdered borosilicate glass, silica glass or lithium aluminosilicate glass, which may be selected depending on the situation. The grain size of the glass powder is preferably not larger than 100 mesh, and further it is preferred that the grain size is uniform in order to facilitate the adhesion of glass matrix to the fibers. According to the present invention, the distance between the plasma melt jetting device 16 and the silicon carbide fiber bundle 2 is important, and it may be determined depending on the situation. For instance, when said distance is too short, the silicon carbide fiber bundle 2 will be damaged, whereas when it is too long, the glass matrix will fail to adhere to the surface of silicon carbide fiber bundle 2.

In FIG. 4, the silicon carbide fiber bundle 2 is wound around a rotary drum 17, and the plasma melt jetting device 16 is movable in parallel with the axis of the rotary drum 17. The plasma melt jetting device 16 performs the plasma melt jetting of glass powder while it moves gradually in parallel with the axial direction of the rotary drum 17. On the other hand, the rotary drum 17 with the silicon carbide fiber bundle 2 wound around it rotates gradually while the device 16 effects the plasma melt jetting of the glass powder to the wound bundle 2.

The silicon carbide fiber bundle 2 with the glass matrix attached thereto is shaped to obtain a desired preform containing the fibers in a predetermined volume ratio. As stated previously, said preform may be cut or laminated if desired and is subjected to thermal molding by the use of a hot press or a high-temperature uniform-pressure press under the aforementioned molding conditions to obtain a fiber/glass composite.

The thus obtained composite which is reinforced in one direction and contains the fibers in an amount by volume of 30 to 50%, and it has a bending strength of 80 to 120 kg/mm² and a rupture resistance ($K_{IC}$) of 15 to 25 MNm$^{-3/2}$ which are higher than those of the conventional composites of similar kind.

As described, the method for manufacturing the silicon carbide fiber reinforced glass composite according to the present invention has the following effects or advantages:

(1) The glass being made to permeate directly among the silicon carbide fibers or melt jetted directly amount the same, the silicon carbide fibers permit not only the glass to permeate completely among the fibers but also the fibers and the glass to adhere closely to each other.

(2) The preform obtained according to the process of the present invention being free of impurities such as resins, said manufacturing process dispenses with the step of removing the resins before treating with a hot press. This enables the glass matrix and the interface between the silicon carbide fibers and the glass to be free of defects caused by the residual impurities during the treatment with the hot press, whereby there can be obtained a composite having high strength and toughness as compared with a composite manufactured by the conventional method.

(3) The glass matrix having been permitted to permeate among or adhere to the surfaces of silicon carbide fibers completely in the preform, not only the silicon carbide fiber bundles but also the preforms of a fabric, mat and multi-dimensional fabric can be manufactured. Furthermore, the preforms can be shaped into various forms such as rectangular parallelopipeds and cylinders by a high-temperature uniform-pressure press.

The present invention will be explained hereunder in more details in reference to the following examples and comparative examples.

EXAMPLE 1

The continuous fibers of silicon carbide (500 fibers/yarn; average diameter of fiber: 15μ; tensile strength: 250 kg/mm²; tensile modulus of elasticity; 20 ton/mm²) were dipped continuously in molten glass of 1500° C. (in a tank) to which the supersonic wave vibration was applied as illustrated in FIG. 1 to permeate the molten glass, LAS (Lithium Aluminosilicate), among them to obtain a wire of silicon carbide fiber/LAB preform (wire diameter: 0.7 mm). Said wire was cut into pieces of a desired length; said pieces of wire were placed (parallel to each other) and in layers of 10 mm deep in a graphite die of 50 mm×80 mm×20 mm (depth) and pressed at a molding pressure of 200 kg/cm² for 20 minutes in an atmosphere of argon at 1400° C. using a high-frequency induction heating type hot press; and the pieces so treated was taken out of the press after cooling. The samples obtained were then subjected to heat treatment at 1200° C. for 5 minutes to crystallize the glass.

The thus obtained silicon carbide fiber reinforced glass composite measuring 50 mm×80 mm×3 mm (thick) was cut into samples each measuring 20 mm (wide)×80 mm×3 mm (thick), and said samples were subjected to a 3-point bending test with a span of 60 mm. The result of this bending test indicated that the samples have a bending strength of 100 kg/mm² and a rupture resistance of 22 MNm$^{-3/2}$ respectively at the room temperature. Furthermore, the result of the 3-point bending test in the air of 1000° C. indicates that the samples have a bending strength of 130 kg/mm² and a rupture resistance of 30 MNm$^{-3/2}$.

EXAMPLE 2

A sizing agent attached to a plain weave fabric (280 g/m²) of continuous silicon carbide fibers was removed therefrom by treating the fabric at 800° C. for 2 hours in the air, and then the fabric was cut into pieces each measuring 100 mm×40 mm. Ten of the pieces of the fabric were laminated. The edges of the pieces in the laminate were stitched and the laminate was shaped into an appropriate form, and then fixed to a holder 12 as shown in FIG. 2. Said laminate was set so that the distance between it and a horn 9 as shown in FIG. 2 was 2 to 3 mm and dipped in molten lithium aluminosilicate (LAS) glass for 20 seconds to obtain a preform. The edges of the thus obtained preform were cut off. The preform was then put in a graphite die and pressed in vacuum at 1100° C. under a pressure of 200 kg/cm$^2$ using a hot press to obtain fiber-glass composite.

A test piece measuring 20 mm×80 mm×3 mm prepared by cutting the glass composite so obtained was subjected to a 3-point bending test with a measuring span of 60 mm. The result of this test indicates that said sample has a bending strength of 50 kg/mm$^2$ and a rupture resistance of 15 MNm$^{-3/2}$ at room temperature, whereas the same exhibits 70 kg/mm$^2$ and 20 MNm$^{-3/2}$ at 1000° C.

COMPARATIVE EXAMPLE 1

Continuous carbon fibers (3000 fibers/yarn; average diameter of fiber: 7μ; tensile strength: 300 kg/mm$^2$; tensile modulus of elasticity: 24 ton/mm$^2$) were impregnated with LAS in the same manner as in Example 1 to obtain a preform wire. Said preform wire was molded by a hot press and subjected to crystallization treatment as in Example 1 to obtain a carbon fiber/LAS composite, and the thus obtained composite was cut to obtain test pieces having the same dimensions and shape as in Example 1. The test pieces were subjected to a 3-point bending test. The result of this test indicates that said test pieces have a bending strength of 80 kg/mm$^2$ and a rupture resistance of 15 MNm$^{-3/2}$ at room temperature, whereas they have 5 kg/mm$^2$ and 3 MNm$^{-3/2}$ at 1000° C. in the air.

COMPARATIVE EXAMPLE 2

Continuous alumina fibers (Fiber: FP, product of Du-Pont, U.S.A.; 200 fibers/yarn; average diameter of fiber: 20μ; tensile strength: 170 kg/mm$^2$; tensile modulus of elasticity: 25 ton/mm$^2$) were made into a LAS composite in the same manner as in Example 1. The result of test of said composite conducted under the same conditions as in Example 1 indicates that said composite has a bending strength of 20 kg/mm$^2$ and a rupture resistance of 5 MNm$^{-3/2}$ at room temperature, whereas it exhibits 10 kg/mm$^2$ and 3 MNm$^{-3/2}$ at 1000° C. in the air.

EXAMPLE 3

Sixty (60) of continuous silicon carbide fibers (500 fibers/yarn; average diameter of fiber: 15μ; tensile strength: 250 kg/mm$^2$; tensile modulus of elasticity: 20 ton/mm$^2$) were pulled and arranged orderly and then continuously subjected to plasma melt jetting of LAS (lithium aluminosilicate) powder having a gain size of 2 to 5μ to obtain a preform sheet (50 mm wide×50 m long×0.5 mm thick) of silicon carbide fiber/LAS composite. The thus obtained preform sheet was cut into pieces each measuring 50 mm wide×80 mm long, and ten of the pieces were laminated to obtain a laminate which was inserted in a graphite die with internal dimensions of 50 mm×80 mm×20 mm (depth), thermally molded at a molding pressure of 100 kg/cm$^2$ in an atmosphere of argon at 1400° C. using a high-frequency induction heating type hot press, cooled and then withdrawn from the die to obtain a silicon carbide fiber reinforced glass composite measuring 50 mm×80 mm×2 mm (thick). A test piece of 20 mm wide×80 mm×2 mm thick was prepared from said composite. The result of 3-point bending test with a measuring span of 60 mm conducted for this test piece indicates that the composite has a bending strength of 95 kg/mm$^2$ and a rupture resistance of 20 MNm$^{-3/2}$ at room temperature, whereas it exhibits 125 kg/mm$^2$ and 25 MNm$^{-3/2}$ at 1000° C. in the air.

What is claimed is:

1. A method for manufacturing a silicon carbide fiber reinforced glass composite, which comprises pulling and arranging continuous silicon carbide fibers orderly in one direction on a roll or a rotary drum, plasma melt ejecting glass powder onto the pulled and arranged silicon carbide fibers while turning said roll or drum, to obtain a silicon carbide fiber glass preform in which the fibers are fixed with the glass attached thereto and are contained in an amount by volume of 30-50% molding the thus obtained preform into a predetermined from and then subjecting the molded preform to thermal molding thereby to manufacture the silicon carbide fiber reinforced glass composite in the form of a molding.

2. A method for manufacturing silicon carbide fiber reinforced glass composite as recited in claim 1, wherein the particle size of said glass powder is not larger than 100 mesh.

3. A method for manufacturing silicon carbide fiber reinforced glass composite as recited in claim 1, or 2, wherein said thermal molding is effected by hot press or high-temperature uniform-pressure press.

* * * * *